UNITED STATES PATENT OFFICE.

WILLIAM J. HUSSEY, OF BOSTON, MASSACHUSETTS.

REMOVING THE SAND AND GLUE FROM WASTE SAND-PAPER.

SPECIFICATION forming part of Letters Patent No. 300,710, dated June 17, 1884.

Application filed March 17, 1884. (No specimens.)

*To all whom it may concern:*

Be it known that I, WILLIAM J. HUSSEY, of Boston, in the county of Suffolk and State of Massachusetts, have invented certain new and useful improvements in processes of removing sand and glue from waste sand-paper, so as to separate the fiber, glue, and sand and restore each in a suitable form for the remanufacture of sand-paper, the Manila fiber being left in a suitable state for repulping, and the sand dried ready for use again, and the glue separated from the liquid mass, ready to be formed into sheets, or otherwise, and dried, of which the following is a specification.

In carrying out my invention I proceed in about the following manner: Take two pounds (2 lbs.), or eight parts of potash and two pounds (2 lbs.) or eight parts salts of potash and dissolve the same in four gallons of water; then add to this solution about thirty gallons of hot water; then add to the solution one-half pound of liquid ammonia; then immerse the waste sand-paper therein and stir the mass briskly for two or three minutes, (more or less,) until the sand and glue are separated from the paper; then remove the paper and immediately immerse the same in a solution composed of one-half pound (½ lb.) of alum and one-half pound (½ lb.) of borax dissolved in about thirty gallons of warm water, and stir the mass for five minutes, when the waste paper may be removed directly to a pulp-mill and converted into pulp without previous drying; or, if desired, it may be dried in any suitable manner and subsequently converted into pulp in the usual manner. The first solution of potash having cooled and settled, the glue (in jelly form) may be removed from the top of the same and formed into sheets and dried in the usual manner, or mixed with glue-stock and treated as heretofore, and the sand separated from the remaining liquid and dried and then graded, ready for use in the manufacture of sand-paper, or employed in any of the commercial uses for which the same may be desirable.

The above-stated proportions may be varied without departing from the essential features of my invention, or a single form of potash may be employed of the required strength and serve the purposes contemplated by my process.

Having thus described my invention, what I claim is—

The above-described process of removing sand and glue from waste sand-paper, consisting in immersing the same in a hot solution of potash, then removing the paper and immersing it in a warm solution of alum and borax, substantially as and for the purposes set forth.

WILLIAM J. HUSSEY.

Witnesses:
SYLVENUS WALKER,
CHAS. S. GOODING.